Figure 4:
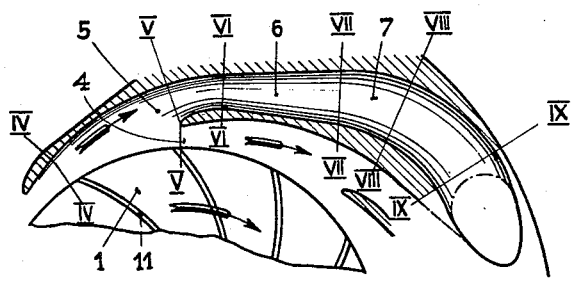

May 13, 1952     A. BUCHI     2,596,646
OUTLET GUIDING ARRANGEMENT
Filed Oct. 17, 1951     4 Sheets-Sheet 1
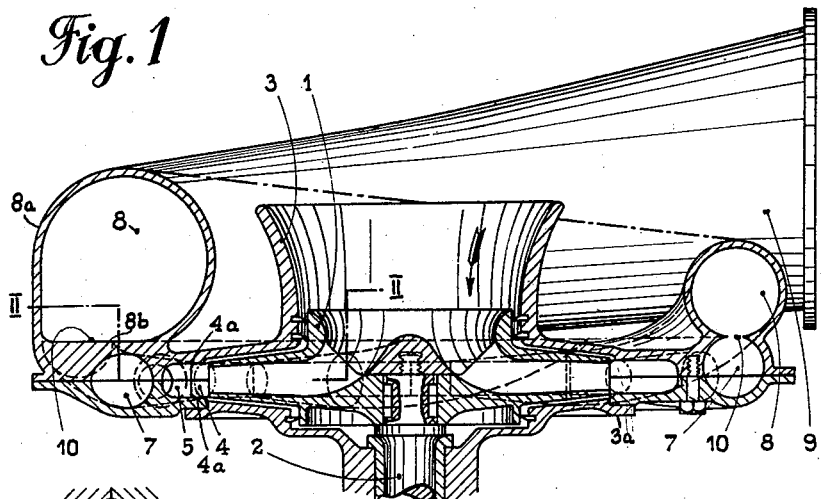
Fig. 1
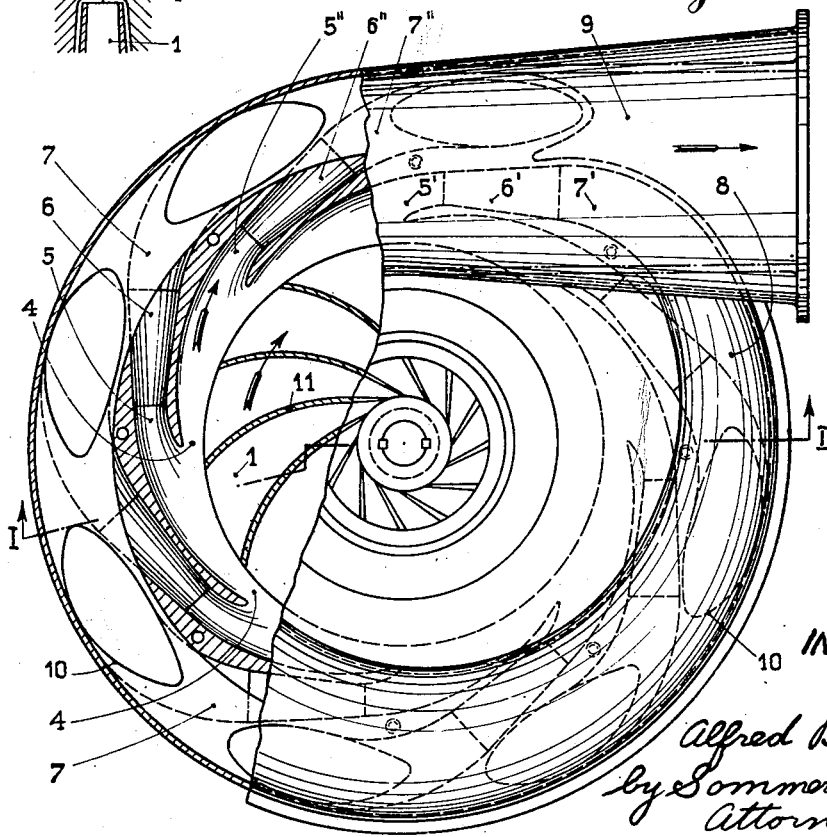
Fig. 3
Fig. 2
INVENTOR:
Alfred Büchi
by Sommers + Young
Attorneys May 13, 1952     A. BUCHI     2,596,646
OUTLET GUIDING ARRANGEMENT
Filed Oct. 17, 1951     4 Sheets-Sheet 2

INVENTOR:
Alfred Büchi
by Sommers·Young
Attorneys

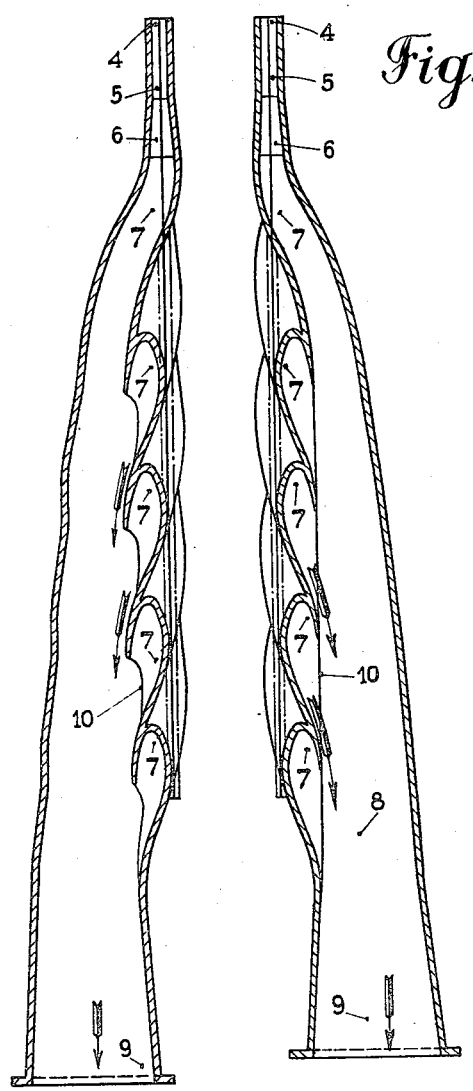
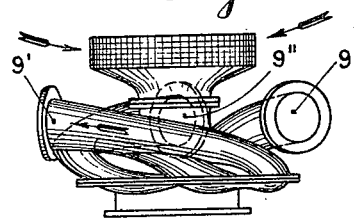
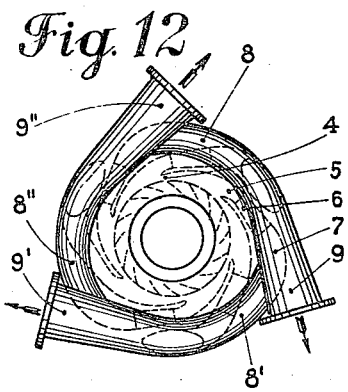
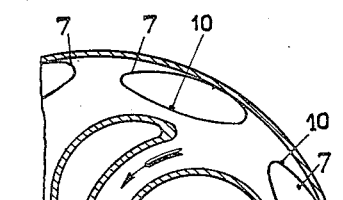

INVENTOR:
Alfred Büchi
by Sommers & Young
Attorneys

Patented May 13, 1952

2,596,646

UNITED STATES PATENT OFFICE 2,596,646

OUTLET GUIDING ARRANGEMENT

Alfred Buchi, Winterthur, Switzerland

Application October 17, 1951, Serial No. 251,741
In Switzerland January 19, 1946

11 Claims. (Cl. 103—111)

This invention relates to an improved outlet-guiding arrangement for centrifugal blowers and pumps. The present application is a continuation-in-part of my application Ser. 723,080, filed January 20, 1947, which has been abandoned.

The efficiency of a centrifugal pump or blower depends not only upon such factors as the rotor speed, bearing friction, rotor disc friction, shock losses at the rotor intake and outlet, but also upon the duct arrangement whereby the fluid leaving the periphery of the rotor blading under high velocity and in a direction having a substantial tangential component is captured, its velocity converted into pressure, and the fluid guided into one or more streams of desired definition and direction. It is desirable that such a guide duct arrangement effect a smooth and shock-free flow of the pressure fluid within a minimum passage length and such is a primary object of my invention.

My present invention provides in its preferred embodiment a series of guide duct diffusers which are directed substantially tangentially from the rotor blading and are at least partially axially deflected towards a scroll space, itself offset axially of the blower rotor. In such an arrangement, I define the scroll space by a portion of the blower housing which includes a lateral wall provided with a series of openings. The diffusers discharge their pressure fluid via these openings into the scroll space so partially defined by such lateral wall, in a substantially circumferential direction. It is my preference that the diffusers themselves should not project through this lateral wall so that the inner wall defining the scroll space presents a smooth contour to the pressure fluid passing therethrough.

It is also an object of my invention to provide a duct arrangement wherein at corresponding points in the arrangement equal speeds and pressures of the fluid are maintained, thereby to reduce impact losses in the fluid as it passes from the diffusers into the scroll space or spaces.

It is also an object of my invention to provide an arrangement which in different embodiments may utilize duct diffusers of several different contours and directions.

It is also an object to provide an arrangement which lends itself to die casting and hence to facilitate manufacture thereof.

It is also an object of my invention to permit the effecting of a substantial conversion of the fluid velocity into pressure before the fluid streams are deflected toward the laterally offset scroll space, thereby to reduce flow losses.

It is also an object to effect the circumferential deflection of the fluid streams into the scroll space under the widest radius of curvature.

These and other objects are attained in the apparatus hereafter described and illustrated in the accompanying drawings in which are shown in Fig. 1, an axial section of a single stage blower taken on line I—I of Fig. 2, Fig. 2, an intake-end or plan view of the latter, partly in stepped section on line II—II of Fig. 1 through rotor and outlet guiding arrangement.

Figure 7:
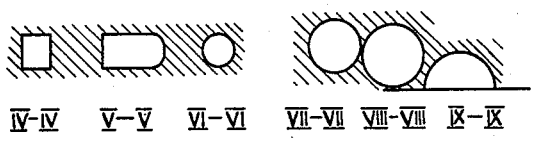
Figure 5:
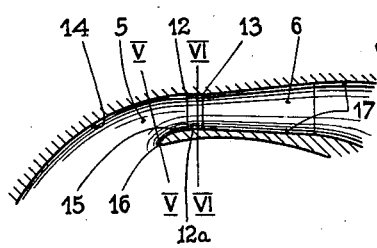
Figure 6:
Figure 9:
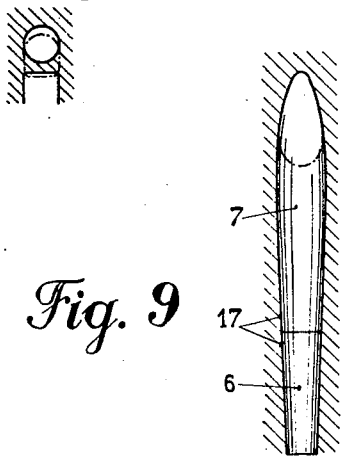
Figure 8:
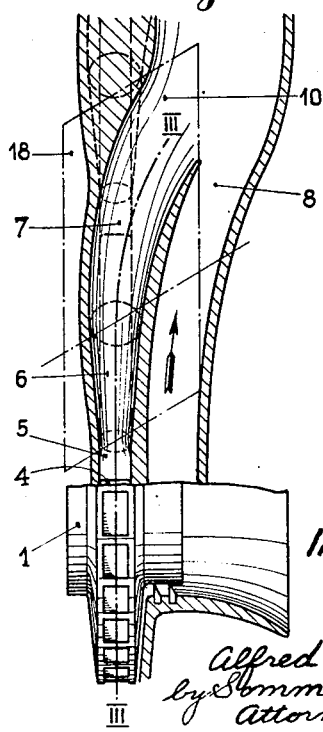

Fig. 3, a partial axial section through the said blower, illustrating a modified design of the outlet transition portion from rotor-gap to guide-duct, Fig. 4, a section of the said blower, transverse of the rotor axis and on the double-curved center line of one of the six guide-ducts, on curve III—III of Fig. 8, Fig. 5, a partial section similar to Fig. 4, illustrating a modified transition at the entrance to the guide-duct diffuser proper, Fig. 6, a cross-section on line VI—VI of Fig. 5, Fig. 7, a series of consecutive cross-sections through the guiding-arrangement of Fig. 4 on the lines IV—IV to IX—IX thereof, Fig. 8, a section, more in a tangential direction, on the center line of a guide-duct diffuser, inclusive of the lateral collecting scroll case, Fig. 9, a section, transverse of the rotor axis and on the single-curved center line of a modified guide-duct diffuser indicated by dash lines in Fig. 8, Fig. 10, a tangential developed section through the first guide-duct diffuser, the scroll case, and the final delivery bend, Fig. 11, a section, similar to Fig. 10, of a modified guiding-arrangement which affords a scroll case having a smooth outside wall.

Figs. 12 and 13, an intake end-view and elevation respectively of a guide arrangement comprising three outlet scroll cases and final bends; Fig. 13 showing also an air filter.

Figure 14:
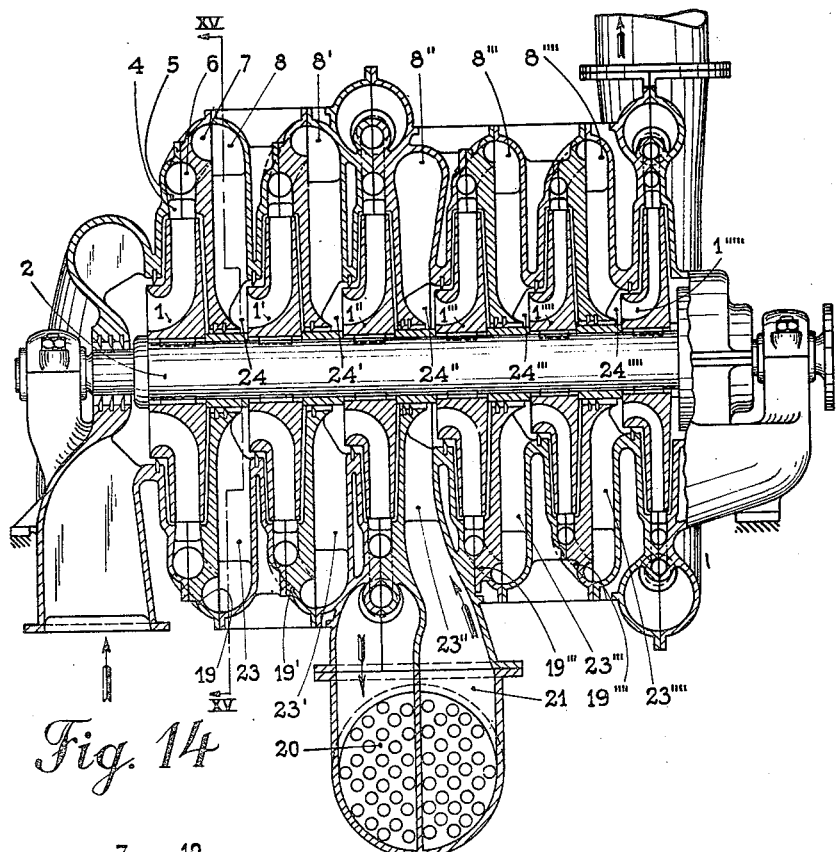
Figure 16:
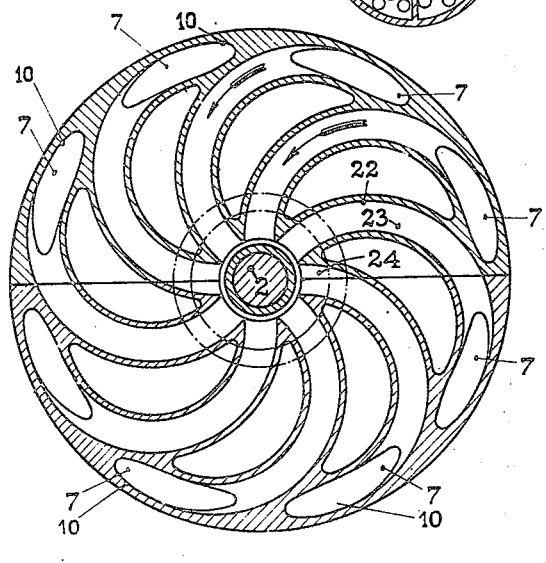

Fig. 14, a longitudinal section through a blower with six stages, including a cooler, Fig. 15, a cross-section taken on the line XV—XV of the blower shown in the apparatus, and Fig. 16, a section similar to Fig. 15 but showing a modified embodiment of the return duct arrangement.

Referring to Figs. 1 and 2, reference character 1 represents a centrifugal blower-rotor having blading 11 and being driven by shaft 2. A housing 3a encloses the rotor 1. A portion 3 of this housing 3a forms a funnel which provides the entrance area for the fluid to be compressed. The discharge of the pressure fluid from the blading 11 is effected into the clearance gap 4 which surrounds the rotor 1.

In this preferred embodiment of my present invention I have shown eight sickle-shaped discharge openings 5 which originate in the portion 4a of the housing 3a, which portion partially defines the gap 4. These openings 5 serve to conduct the pressure fluid into rectilinear diffusers 6 which are directed substantially tangentially with respect to the rotor 1 and transversely of the blower axis. Following each of these rectilinear diffusers 6, I have shown further guide duct portions 7, the walls of which will be seen in Fig. 2 to diverge from each other for at least part of their extent. These portions 7, moreover, are curved tangentially as well as axially of the rotor 1 so as to deliver the pressure fluid directly into a scroll space 8 which is disposed laterally offset of the rotor 1. The scroll space 8, defined by the wall 8a, itself a portion of the blower housing 3a, is shown in Figs. 1 and 2, as an annular chamber originating at guide duct portion 7' and discharging into pressure branch 9. The latter may be constructed either as a pipe of uniform cross-section (as shown by the dash-and-dot lines of Fig. 2) or as a further diffuser (as shown by the full lines of Fig. 2).

An important feature of my invention is the manner in which I dispose these curved portions 7 to discharge the pressure fluid into the scroll space 8. The curved diffuser portions 7 are disposed to approach the nearest side 8b of the wall 8a at such angle that the pressure fluid is admitted into the scroll space 8 in a direction which is substantially circumferential of the blower. The side 8b of the wall 8a is, in effect, cut to accommodate the intersection therethrough of the curved portions 7, and the latter are then cut off along the lines of intersection which, in this embodiment, are shown to lie in the plane 10, normal to the rotor axis. As a result of these cut-offs of the curved portions 7 it will readily be seen that the side 8b of the wall 8a is provided with a series of substantially elliptical orifices at each intersection, but otherwise the inner area of the entire wall 8a, including the side 8b, is without protrusion. This scroll wall smoothness affords excellent flow characteristics within the scroll space 8. Each fluid stream (subsequent to the first, flowing through the curved portion 7' which constitutes the head of the scroll) will thus be found to join the preceding stream or combination of streams in the most natural manner and with a minimum of turbulence. This particular feature of my invention may be employed in any guide duct arrangement with noticeable improvement in performance efficiency, regardless of whether the other features of my invention, particularly those pertaining to my preferred diffuser arrangement, are also adopted.

To further improve the flow characteristics of the arrangement, I recommend also that the outlet opening of at least one curved portion 7 be so disposed as to discharge the pressure fluid directly into an exit connection branch 9 in the direction of the latter. This is illustrated by 7'' in Fig. 2, and is also shown in Figs. 10 and 11.

The clearance gap 4, as well as the discharge openings 5 are shown in my preferred embodiment (Fig. 1) as being defined by parallel walls 4a which walls are at right angles to the blower axis. This construction results in the approximately rectangular cross-sections IV—IV and V—V of these passages shown in Fig. 7. These walls may, however, be advantageously uniformly or non-uniformly enlarged to diverge outwardly as shown in Fig. 3 to give trapezoidal cross-sections.

The details of construction of the gap 4, an opening 5 and the ensuing rectilinear diffusers 6 and curved diffuser portion 7 in my preferred embodiment are shown in Figs. 4 and 7. The curved portion 7 will be seen to be twisted radially as well as axially before passing the pressure fluid into the scroll space 8 which, as previously stated, is laterally offset with respect to the rotor.

The transition of the pressure fluid from the sickle-shaped opening 5 to the rectilinear diffuser portion 6 is illustrated in a larger scale in Figs. 5 and 6. From these latter figures it will be seen that I preferably interpose a parallel-walled circular duct portion 12a in the area of transition of the pressure fluid between the channel of opening 5 and the rectilinear diffuser 6, i. e., between lines 12 and 13 of Fig. 5. This circular duct portion 12a serves to bring the pressure fluid into a straight path with uniform velocities and pressures at the entrance 13 to diffuser portion 6, after the fluid has initially flowed along the curved walls 14 and 15 at different velocities because of torsional effect and the disturbance in its movement within the range of the entering edge 16. Attaining this uniformity at the entrance 13 to diffuser portion 6, enables the latter more effectively to convert velocity into pressure. The transition in the cross-sections 12 and 13, however, should be well rounded, i. e., sharp edges should be avoided. This preferred cross-sectional shape is shown in VI—VI of Fig. 7.

While I have shown in my preferred embodiment the walls 17 of the straight diffuser portion 6 and the curved diffuser portion 7 as diverging uniformly over the entire length of these portions, i. e., at a constant angle of diversion, in some instances it might be desirable to provide for the diversion of the walls in these portions at different angles. For example, a small angle might be best suited at the entrance 13 to the diffuser portion 6 where the fluid is moving at high velocity; the angle of divergence might then be gradually increased porportional to the distance from diffuser entrance, in this way to provide an optimum angle of divergence for the fluid velocity occurring in each segment of the diffuser portions.

It will further be seen from sections VII—VII, VIII—VIII Fig. 7, that I have preferably constructed these guide duct diffuser portions with circular cross-sections in order to keep friction and conversion losses therein to a minimum. While the cross-section IX—IX at the discharge outlet appears to be semi-circular, it will be borne in mind that at such section one-half of the pressure fluid has already been transferred into the scroll space 8. It is also desirable to make the radius of curvature of the guide-duct portion 7 relatively large to avoid large deflection losses as well as to minimize friction and conversion losses. Moreover, as shown in Figs. 1 and 4, the initial desirable large radius of curvature at the entrance to the curved diffuser portion 7, may be gradually decreased towards the diffuser exit into the scroll space 8.

I also prefer, in the construction of my diffusers, that the narrowest cross-sectional area VI—VI at the entrance into the straight diffuser 6 be somewhat smaller than the cross-sectional area immediately adjacent the point 16 where the fluid enters the duct series. In this manner there may be avoided any substantial pressure losses which would tend to occur because of the necessarily sharper and more irregular deflection of the walls 14 and 15 (especially the latter) of the intake channels 5 from the at least partly rectangular, trapezoidal or other cross-sectional shapes into the preferably circular cross-sectionally-shaped entrance of the straight diffuser 6. By thus making the cross-section at VI—VI narrower than that at V—V, the velocity of the pressure fluid is accelerated between these sections so that minimum losses occur even in the case of relatively small and non-uniform radii of curvature there existent. Greater conversion of velocity into pressure is then possible in the adjoining guide-duct portions 6 and 7.

In the view shown in Fig. 8, the laterally curved axis of the portion 7 and the straight axis of the portion 6 will both be seen to lie in one and the same plane 18 indicated by the dash-and-dot lines. By this disposition of these axes, I effect the desired laterally deflected flow of the pressure fluid toward the scroll space 8 in accordance with my invention. In this embodiment it is possible to arrange the cross-sections of side-walls 17 of the portions 6 and 7 at right angles to plane 18; these side walls may be rectilinear in the same direction and provided with the same angle of divergence as is shown in Fig. 9. The most pronounced curvature of the guide-duct portion 7, in this embodiment, then occurs in plane 18; at right angles thereto there would occur no curvature in said portion with the result that deflection losses in portion 7 would be less than if the axes of guide-duct portions 6 and 7 were not so situated in one and the same plane.

Following the course of a particle of the pressure fluid, it will be seen that, upon leaving the rotor blading 11, the particle is projected into the clearance gap 4, thence passing into one of the intake openings or channels 5. From here it moves onward into the straight diffuser portion 6, the axis of which approximately coincides with that of the intake channel 5. Next the particle flows into and through the curved guide-duct diffuser portion 7 into the scroll space 8, laterally offset with respect to the rotor; and finally into the outlet tube 9.

The pressure fluid particles entering the other guide ducts similarly flow through the latter and enter the scroll space 8 via the respective curved portion 7 of each duct. I also prefer to make a gradual enlargement of the cross-section of the scroll space 8 as each additional fluid stream enters this space, so as to enable the inflowing pressure fluid to be conducted onward through the scroll case with minimum losses, i. e., at approximately the same velocities. This increase in cross-section of the scroll space is illustrated in the embodiments of Figs. 10 and 11 in which five sets of guide-ducts 4—7 are shown.

In the embodiment of Figs. 12, 13 I have shown three outlet tubes 9, 9', 9" instead of the single tube of the Figs. 1, 2, 10 and 11 embodiments. Into each tube is discharged the fluid of two guide-ducts 4—7, although three or more guide ducts 4—7 could be combined to deliver pressure fluid into one of a plurality of outlet tubes 9. Embodiments which include a plurality of scroll cases 8 and outlet tubes 9 are useful wherever the pressure has to be delivered to several places of use, such as coolers, etc.

It is also a feature of my invention to construct such a guide-duct arrangement as has heretofore been described as a two-part casing divided in a plane normal to the rotor axis and passing approximately through the center of the rotor. Each half of this casing may be oppositely die cast or otherwise formed to provide smooth walls of such contour that when the two thus-cast or formed halves are brought together in the same plane, a rotor housing and guide-duct-scroll arrangement in accordance with my invention will be found to result. Suitable means such as bolts 20 may be employed to secure these two casing parts together.

In the apparatus of Fig. 14, reference characters 1—1''''' designate six rotors driven by the same shaft 2. From a study of this figure it will be observed that the pressure fluid is discharged from each rotor into a clearance gap 4, thence passing to intakes 5, and to straight diffuser portions 6. In the case of each of the four rotors 1, 1', 1''' and 1'''', the pressure fluid is further delivered into the guide duct portions 7 which are preferably curved and diverging both in a tangential as well as axial direction, in accordance with the principles of my invention heretofore discussed. From these portions 7, the pressure fluid then flows into the scroll cases 8, 8', 8''' and 8'''' arranged respectively between the first and second, the second and third, the fourth and fifth, and the fifth and sixth stages. The walls 19—19'''' (shown as dotted lines) of the guide duct portions 7 indicate the deflection of the latter toward the scroll cases 8, 8', 8''' and 8''''. The pressure fluid is discharged from the portions 7 immediately to the outer circumference of the scroll spaces 8 in a tangential direction which is initially maintained in the scroll cases. It should be noted that after the fluid leaves the third rotor 1'', it passes through a cooler 20, thence back into the eye of the fourth blower 1''' via duct 21. It should also be noted that since the entire guiding arrangement leading to the cooler is centered about a plane at right angles to the blower axis and itself centered with respect to the rotor 1'', it is not necessary to construct this guide arrangement 4—7 in accordance with my present invention, but instead it may be laid out in accordance with prior art.

Instead of one cooler 20, I may provide a plurality of coolers.

The guiding arrangement for the last rotor may be constructed, either according to my present invention with axial deflection, or without such deflection similar to the arrangement for rotor 1''.

Fig. 15 shows how the pressure medium flows from the eight guide-duct portions 7 first tangentially, and thence into the ducts 23 formed by the outstretching blade portions 22. The ducts 23 conduct the medium radially inward toward the blower shaft 2 into the eye of the next stage 1'. In this preferred embodiment, I suggest that the blading 22 should be dimensioned to provide such cross-sectional areas for the ducts 23 that velocity losses are kept at a minimum.

In the Fig. 16 embodiment, I have shown the vanes so dimensioned and disposed as to make the guide-ducts 23 of uniform cross-section. These guide-ducts convey the medium separately from the curved diffuser portions 7 into the annular entrance chamber 24 to the next rotor 1'. This arrangement may also be applied to the stages 1', 1''' and 1''''.

If the principles of my invention described above are applied in the manner recommended, a guide-duct arrangement of materially increased efficiency over heretofore known types will be found to result in that frictional, impact and turbulence losses will be kept at a minimum.

Obviously, various modified embodiments of my teaching will occur to those skilled in the art. All these I intend to comprehend within the scope of my invention.

I claim:

1. In a centrifugal blower or pump having a bladed rotor and a housing enclosing said rotor, a delivery guiding arrangement including a series of guide-duct diffusers extending through said housing and radiating from the rotor periphery, said diffusers being directed at least partially axially of the blower, said housing also having a portion forming a scroll space, said diffusers being disposed outside of said housing portion forming said scroll space and said scroll space being offset axially on the same side of the rotor toward which said diffusers are directed, said housing portion forming said scroll space including a wall defining the side of the scroll space adjacent said diffusers, said wall being provided with a series of openings corresponding in number with the number of said diffusers and registering with their discharge orifices, said diffusers extending, however, only to the edges of said wall defining said openings and said diffusers being disposed to approach said wall at such angle that the pressure fluid from the said diffusers is admitted into the scroll space in substantially circumferential direction.

2. In a centrifugal blower or pump having a bladed rotor, a delivery guiding arrangement comprising a collecting chamber formed by a substantially cylindrical wall surrounding concentrically the rotor, said wall having a series of orifices through its circumference disposed radially beyond the rotor blading, a plurality of intake canals beginning at said orifices and extending substantially tangentially from said cylindrical wall to receive the fluid from the rotor blading, a plurality of guide-duct diffusers, one communicating with each of said orifices, each continuing the fluid passage of one of said canals and each said diffuser having two distinct consecutive portions consisting of a divergent front portion with a straight axis lying substantially in a radial plane relative to the blower axis and a divergent rear portion with an axis deflected axially of the blower, both portions being adapted to convert the velocity head of the fluid into pressure head, a casing portion forming a scroll space, said diffusers being disposed outside of said casing portion forming said scroll space and said scroll space being offset axially from, but adjacent to said guide-duct diffuser rear portions, said casing portion being provided with a series of openings on the side thereof adjacent to said diffuser rear portions, said openings corresponding in number with the number of guide-duct diffusers and registering with the discharge orifices of said guide-duct diffuser rear portions, said rear portions extending, however, only to the edges of said casing portion defining said several openings, and said rear portions being disposed to approach said casing portion at such an angle that the pressure fluid from the said diffusers is admitted into the scroll space in substantially circumferential direction.

3. In a centrifugal blower or pump having a bladed rotor, a delivery guiding arrangement comprising a collecting chamber formed by a substantially cylindrical wall surrounding concentrically the rotor, said wall having a series of orifices through its circumference disposed radially beyond the rotor blading, a plurality of intake canals beginning at said orifices and extending substantially tangentially from said cylindrical wall to receive the fluid from the rotor blading, a plurality of guide-duct diffusers, each continuing the fluid passage of one of said canals and each said diffuser having two distinct consecutive portions consisting of a divergent front portion with a straight axis and a divergent rear portion with a deflected axis, both said axes being disposed in one and the same plane, said plane extending obliquely to the blower axis, and both said diffuser portions being adapted to convert the velocity head of the fluid into pressure head, a casing portion forming a scroll space, said diffusers being disposed outside of said casing portion forming said scroll space and said scroll space being offset axially from but adjacent to said guide-duct diffuser rear portions, said casing portion being provided with a series of inlet openings on the side thereof adjacent to said diffuser rear portions, said openings corresponding in number with the number of guide-duct diffusers and registering with the discharge orifices of said guide-duct diffuser rear portions, said rear portions extending, however, only to the edges of said casing portions defining said several inlet openings, and said rear portions being disposed to approach said casing portion at such angle that the pressure fluid is admitted into the scroll space in substantially circumferential direction.

4. In a centrifugal blower or pump having a bladed rotor, a delivery guiding arrangement comprising a collecting chamber formed by a substantially cylindrical wall surrounding concentrically the rotor, said wall having a series of orifices through its circumference disposed radially beyond the rotor blading, a plurality of guide-duct diffusers, one communicating with each of said orifices, each said diffuser having two distinct consecutive portions consisting of a divergent front portion with a straight axis lying substantially in a radial plane relative to the blower axis and a divergent rear portion with an axis deflected axially of the blower, both portions being adapted to convert the velocity head of the fluid into pressure head, a casing portion forming a scroll space, said diffusers being disposed outside of said casing portion forming said scroll space and said scroll space being offset axially from, but adjacent to, said guide-duct diffuser rear portions, said casing portion being provided with a series of openings on the side thereof adjacent to said diffuser rear portions, said openings corresponding in number with the number of guide-duct diffusers and registering with the discharge orifices of said guide-duct diffuser rear portions, said rear portions extending, however, only to the edges of said casing portion defining said several openings, and said rear portions being disposed to approach said casing portion at such an angle that the pressure fluid from the said diffusers is admitted into the scroll space in substantially circumferential direction.

5. The delivery guiding arrangement, as set forth in claim 1, in which the number of separate guide-duct diffusers for the rotor is more than three and less than eight inclusive.

6. A delivery guiding arrangement as set forth in claim 1 wherein each guide-duct diffuser has a front portion with a straight axis, a series of intake canals are provided to receive the fluid tangentially from the rotor periphery, each of said canals communicates with and precedes one of the guide-duct diffusers, and a guide portion is interposed between the entrance of each said canal and the front portion of the diffuser with which it communicates, said guide portion being substantially coaxial with the said guide portion.

7. A delivery guiding arrangement as set forth in claim 1 wherein a series of intake canals are provided to receive the fluid tangentially from the rotor periphery, each of said canals communicates with and precedes one of the guide-duct diffusers, and the cross-section of the front portion of each of said diffusers is smaller than the cross-section of the entrance of the intake canal communicating with said diffuser.

8. The delivery guiding arrangement as defined in claim 1 wherein each of the guide-duct diffusers includes a rear portion having a curved axis and at least one of said rear portions opens directly into an exit connection branch in the direction of the latter.

9. The delivery guiding arrangement as defined in claim 1 wherein each of the guide-duct diffusers includes a rear portion having a curved axis and at least one of said rear portions opens into the head end of at least one scroll casing.

10. A delivery guiding arrangement as described in claim 1 wherein the said guide-duct diffusers are constituted of a surface of a first casing part, said surface being appropriately formed to define a portion of said diffusers, and of an oppositely formed surface of a second separate casing part, said two surfaces being brought together in a plane normal to the axis of the pump or blower to register the corresponding formations of both said surfaces.

11. The delivery guiding arrangement as described in claim 10 wherein the side of one of said casing portions opposite the said formed surface forms a scroll space provided with a series of openings with which the guide-duct diffuser rear portions communicate.

ALFRED BUCHI.

REFERENCES CITED

The following references are of record in the file of this patent:

UNITED STATES PATENTS

| Number | Name | Date |
|---|---|---|
| 1,392,090 | Tamini | Sept. 27, 1921 |
| 2,289,231 | Auger et al. | July 7, 1942 |
| 2,311,024 | Buchi | Feb. 16, 1943 |
| 2,405,048 | Nickerson | July 30, 1946 |

FOREIGN PATENTS

| Number | Country | Date |
|---|---|---|
| 146,064 | Switzerland | June 16, 1931 |
| 170,815 | Great Britain | Oct. 14, 1921 |
| 400,465 | Germany | Aug. 19, 1924 |